(12) United States Patent
Stagg

(10) Patent No.: US 9,523,372 B2
(45) Date of Patent: Dec. 20, 2016

(54) FAN WITH OVERMOLDED BLADES

(75) Inventor: Jonathan B. Stagg, Bellevue, MI (US)

(73) Assignee: BorgWarner Inc., Auburn Hills, MI (US)

( * ) Notice: Subject to any disclaimer, the term of this patent is extended or adjusted under 35 U.S.C. 154(b) by 595 days.

(21) Appl. No.: 13/696,672

(22) PCT Filed: May 6, 2011

(86) PCT No.: PCT/US2011/035542
§ 371 (c)(1),
(2), (4) Date: Feb. 28, 2013

(87) PCT Pub. No.: WO2011/143064
PCT Pub. Date: Nov. 17, 2011

(65) Prior Publication Data
US 2013/0202441 A1 Aug. 8, 2013

Related U.S. Application Data

(60) Provisional application No. 61/333,248, filed on May 10, 2010.

(51) Int. Cl.
F04D 29/00 (2006.01)
F04D 29/34 (2006.01)
F01D 5/30 (2006.01)
F04D 29/32 (2006.01)
B29C 45/14 (2006.01)
F04D 29/02 (2006.01)
F04D 29/38 (2006.01)
B29C 70/68 (2006.01)
B29L 31/08 (2006.01)

(52) U.S. Cl.
CPC ......... *F04D 29/34* (2013.01); *B29C 45/14336* (2013.01); *B29C 70/68* (2013.01); *F01D 5/30* (2013.01); *F04D 29/023* (2013.01); *F04D 29/322* (2013.01); *F04D 29/329* (2013.01); *F04D 29/388* (2013.01); *B29C 2045/14327* (2013.01); *B29L 2031/087* (2013.01); *F05D 2230/23* (2013.01); *F05D 2300/43* (2013.01)

(58) Field of Classification Search
CPC .......... F04D 29/34; F04D 29/322; F01D 5/30
USPC ........................................ 416/204 R, 169 A
See application file for complete search history.

(56) References Cited

U.S. PATENT DOCUMENTS

| | | | | |
|---|---|---|---|---|
| 2,251,887 A * | 8/1941 | Larsh | | 416/229 R |
| 4,762,465 A * | 8/1988 | Friedrichs | | 416/185 |
| 4,957,414 A * | 9/1990 | Willingham | | 416/229 R |
| 5,358,382 A * | 10/1994 | Muhlbach | | 416/169 A |
| 5,501,010 A | 3/1996 | Scott | | |
| 5,655,882 A * | 8/1997 | Morgan et al. | | 416/204 R |
| 6,206,639 B1 | 3/2001 | Light et al. | | |
| D446,295 S | 8/2001 | Williams et al. | | |
| 6,302,650 B1 | 10/2001 | Williams et al. | | |
| 6,343,915 B2 | 2/2002 | Williams et al. | | |

(Continued)

*Primary Examiner* — Charles Freay
*Assistant Examiner* — Christopher Bobish
(74) *Attorney, Agent, or Firm* — Harness, Dickey & Pierce, P.L.C.; John A. Artz PC

(57) ABSTRACT

A fan member particularly for use in a vehicle cooling system. A formed metal hub member with a plurality of plastic polymer blade members. The blade members are overmolded on the hub member, preferably individually. The plastic polymer material is molded through openings in the hub member to help securely hold the blade members in place.

13 Claims, 3 Drawing Sheets

(56) References Cited

U.S. PATENT DOCUMENTS

| | | |
|---|---|---|
| 6,358,009 B1 * | 3/2002 | Link .............................. 416/145 |
| 6,358,010 B2 | 3/2002 | Light et al. |
| 6,375,427 B1 | 4/2002 | Williams et al. |
| 6,530,748 B2 | 3/2003 | Light et al. |
| 6,565,320 B1 | 5/2003 | Surls et al. |
| 6,599,088 B2 | 7/2003 | Stagg |
| 6,790,006 B2 | 9/2004 | Robb |
| 6,827,547 B2 | 12/2004 | Robb |
| 7,063,125 B2 | 6/2006 | Tembreull et al. |
| 7,168,922 B2 | 1/2007 | Stagg et al. |
| 7,331,764 B1 * | 2/2008 | Reynolds et al. ........ 416/204 R |
| 7,789,628 B2 | 9/2010 | Stagg et al. |
| D632,383 S | 2/2011 | Kandell et al. |
| D633,195 S | 2/2011 | Stagg |
| D634,833 S | 3/2011 | Stagg |
| 8,454,300 B2 | 6/2013 | Stagg et al. |
| 8,475,111 B2 | 7/2013 | Stagg et al. |
| 8,550,782 B2 | 10/2013 | Hoskins |
| 8,714,921 B2 | 5/2014 | Tembreull et al. |

* cited by examiner

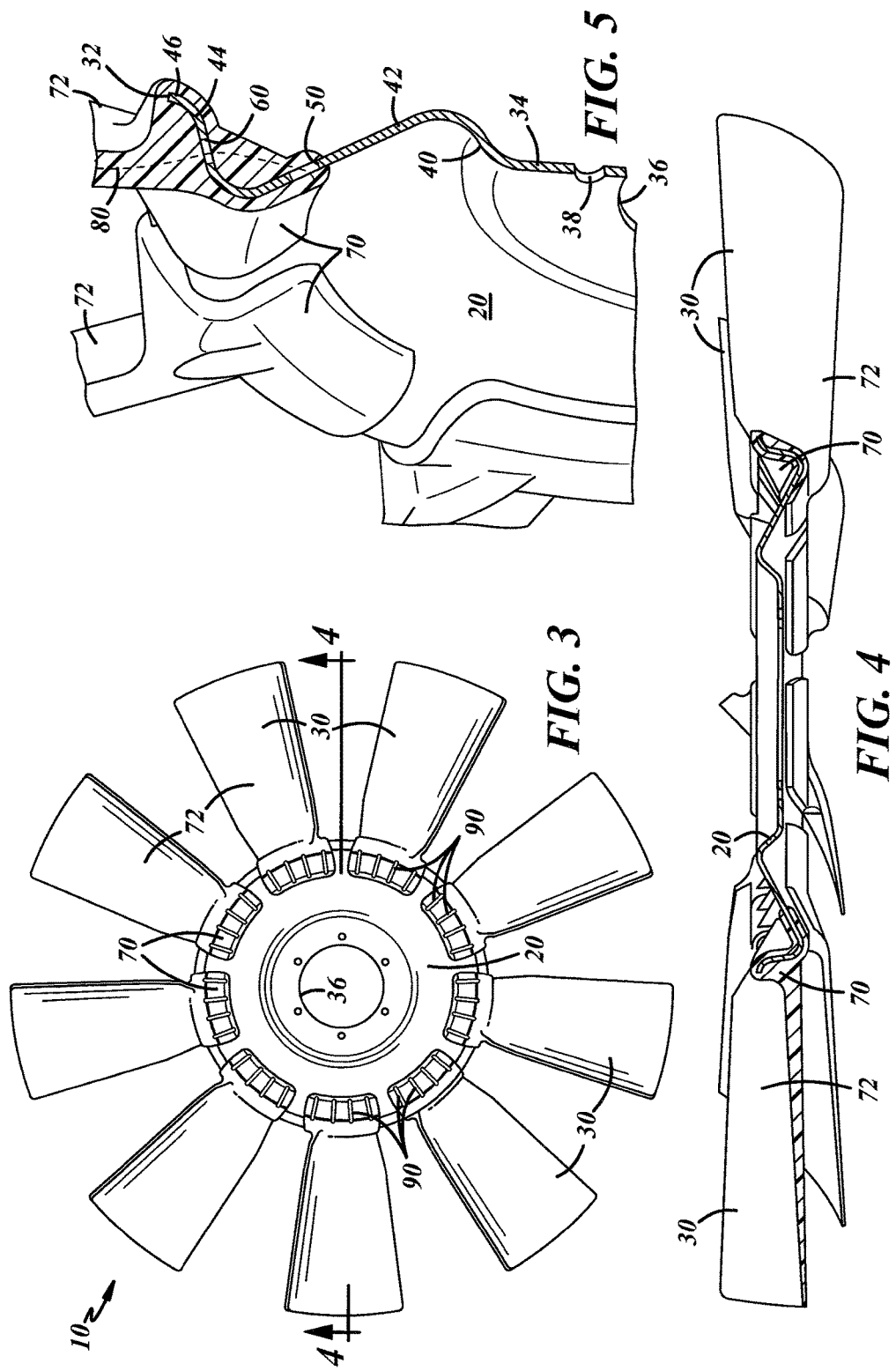

FAN WITH OVERMOLDED BLADES

CROSS-REFERENCE TO RELATED APPLICATIONS

This application is a National Stage Entry of International Patent Application No. PCT/US2011/035542 filed May 6, 2011, which claims the benefit of U.S. Provisional Application No. 61/333,248 filed May 10, 2010.

TECHNICAL FIELD

The present invention relates to fans and more particularly to cooling fans with a metal hub and overmolded fan blades.

BACKGROUND OF THE INVENTION

The use of fans to move air through heat exchanges is well known, especially in the fields of air conditioning and motor vehicle cooling. In motor vehicles, the fans are typically used adjacent radiators in order to either push air or pull air through the radiator in order to cool liquids which are circulating through the engine and/or other accessories. The fans are typically driven by an electric motor or via a transmission from an associated engine in motor vehicles. The fans are usually disposed so that the radial plane of the fan extends parallel to a face portion or surface of the associated heat exchanger, such as a radiator. Fans of this type are commonly referred to as "axial flow fans".

When the systems or vehicles are sold in substantial quantities, cooling fans made with plastic components or made entirely of plastic materials are designed and manufactured for each of the systems or vehicles—and are designed specifically for the particular air flow or that particular system or vehicle. The fans are provided of particular size and shape in order to optimize the air flow through the particular system or vehicle. Due to the large quantities in which the fans are provided, the cost of molds for even large fans are easily absorbed or amortized over the life of the vehicles and fan products. It is uneconomical, however, to provide large fans with molded plastic components for a particular system or vehicle (such as large trucks) which are not made or sold in substantial quantities.

Thus, it is an object of the present invention to provide an improved fan with molded plastic components which is less expensive to make and provide for systems and vehicles which are typically not sold in substantial quantities. It is another object of the present invention to provide a fan with a metal hub member and polymer fan blades which can be manufactured more easily and less expensively.

SUMMARY OF THE INVENTION

The present teachings provide a cooling fan having a hub and a plurality of fan blades. The hub is rotatable about a rotational axis and is formed with first through fifth hub portions. The first hub portion has a flat annular shape. The second hub portion is coupled to a radially outer end of the first hub portion and flares outwardly from the first hub portion in a first direction along the rotational axis. The third hub portion is coupled to a radially outer end of the second hub portion and flares outwardly from the second hub portion in a second direction along the rotational axis that is opposite the first direction. The fourth hub portion is coupled to a radially outer end of the third hub portion and flares outwardly from the third portion in the first direction along the rotational axis. The fifth hub portion is coupled to a radially outer end of the fourth hub portion and extending radially outward therefrom. A plurality of first hole sets are formed through the third hub portion and a plurality of second hole sets are formed through the fourth hub portion. Each of the first hole sets includes a plurality of first holes, while each of the second hole sets includes a plurality of second holes. The second and third hub portions intersect on a first axial side of the first hub portion. The third and fourth hub portions intersect on a second axial side of the hub portion that is opposite the first axial side. The fourth and fifth hub portions intersect on the first axial side of the first hub portion. Each of the fan blades has a blade portion and a base portion that is coupled to the blade portion. The base portion of the fan blades are overmolded onto the third, fourth and fifth hub portions such that: (a) portions of the fourth and fifth hub portions over which the base portion extends are encapsulated in a plastic material from which the base portion is formed, (b) the base portion extends through the plurality of first holes in one of the first hole sets and through the plurality of second holes in one of the second hole sets, (c) the base portion is received into an annular, generally V-shaped channel defined by the fourth hub portion and a portion of the third hub portion, and (d) the base portion is disposed over a portion of the third hub portion on a side that is opposite the annular, generally V-shaped channel. A method for forming a cooling fan is also provided.

Other features, benefits and advantages present invention will become apparent from the following description of the invention, when viewed together with the accompanying drawings and appended claims.

BRIEF DESCRIPTION OF THE DRAWINGS

FIG. 3 is a rear view of the fan shown in FIG. 2.

FIG. 4 is a cross-sectional view of the fan shown in FIG. 2, the cross-section taken along line 4-4 in FIG. 3.

FIG. 5 is an enlarged partial cross-sectional view of the hub member and fan blade as shown in FIGS. 2-4.

DESCRIPTION OF PREFERRED EMBODIMENTS

Figure 1:
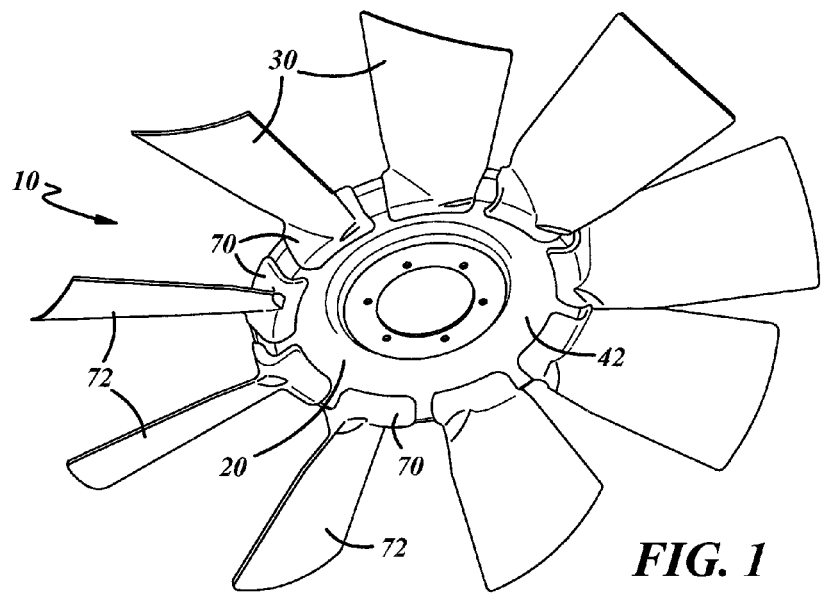
FIG. 1 is a perspective view of a cooling fan according to an embodiment of the present invention.
Figure 2:
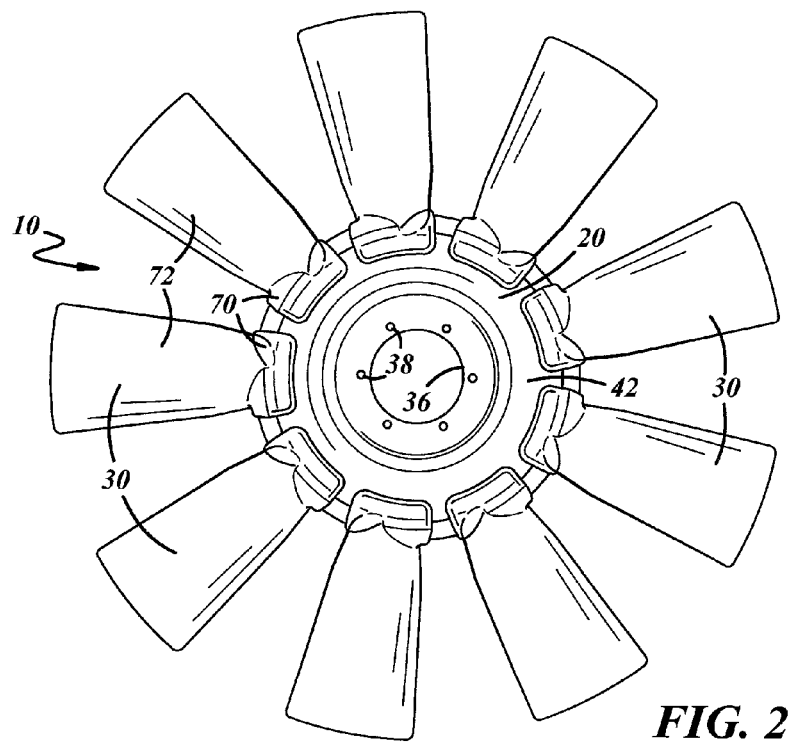
FIG. 2 is a front view of a fan embodiment in accordance with the present invention.

The present invention provides a unique and inventive cooling fan with plastic (or polymer) blade members that can be used in a wide variety of applications, such as air conditioning and motor vehicle cooling. For purposes of the description herein, the present invention will be described only with reference to a preferred use in cooling systems for motor vehicles. However, the invention is not to be limited by this description and the inventor is entitled to all of the benefits and scope of the invention which involves use of the disclosed fan in any cooling system application.

The present invention has particular use for fans in large truck cooling systems. These fans can have diameters of 20-40 inches or more and are typically not produced in large quantities.

The fan member is described generally by the reference numeral 10 in the drawings. The fan 10 has a central hub member 20 and a plurality of blade members 30. The blade members extend radially outwardly, as is typical with fans used in cooling systems.

The configuration and number of fan blade members are not critical with respect to the present invention. Any number of blade members can be utilized. The example disclosed in the drawings herein has nine blade members. The blade members also can have any configuration and shape, such as being curved as shown in the example illustrated in the drawings.

The hub member 20 is preferably made of a metal material, such as steel. Other materials could also be used, depending on the strength and durability requirements of the desired use of the fan 10.

The blade members 30 are preferably made of a plastic polymer material, such as glass filled nylon. One acceptable glass filled nylon material is Nylon 6. Other thermoplastic polymer or resin materials, thereto setting polymer materials, and other engineered resins could also be used, depending on the air flow and durability requirements of the desired use of the fan 10. For convenience of the present description, all of these materials will be referred to generally by the term "plastic polymer materials."

Figure 6:
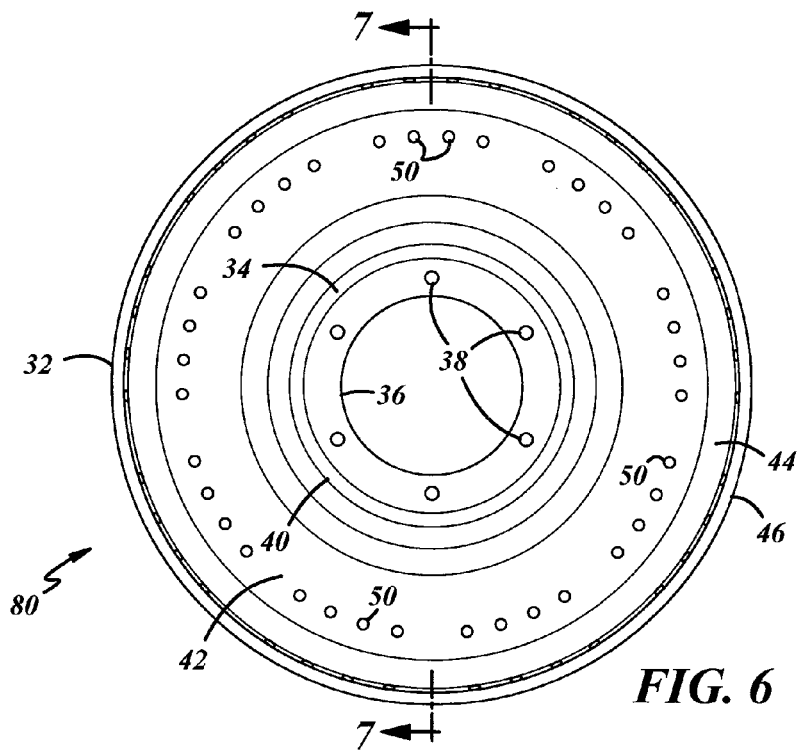
FIGS. 6-8 depict a hub member for use with the present invention, with FIG. 7 being a cross-sectional view.
Figure 7:
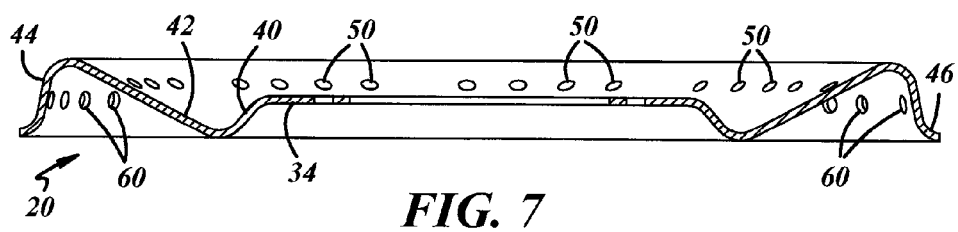
Figure 8:
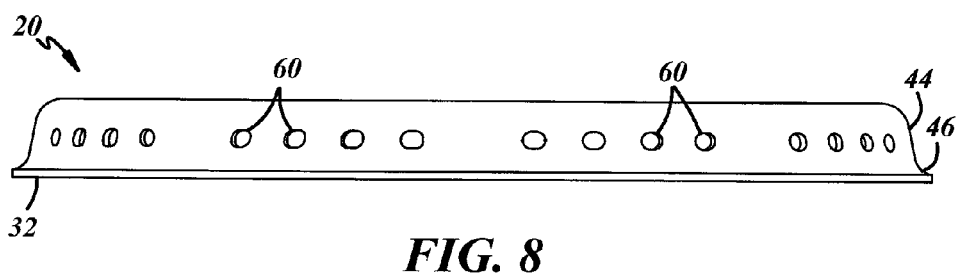

A preferred hub member 20 is shown in FIGS. 6-8. The hub member has a circular outer perimeter 32 and a formed disk-shaped cross-section. Providing the hub member with a non-flat formed cross-section increases the strength of the hub member. It allows the entire hub member to share loads more evenly and uniformly.

The hub member 20 has a raised central portion 34 with a central opening 36 and a plurality of mounting holes 38. The opening 36 saves weight and allows the fan to be positioned on or over a protruding mount or portion of an engine. The holes 38 are used to mount the fan member on a vehicle engine or component. Preferably fasteners such as bolts (not shown) are used to secure the fan member in place through the use of the holes 38.

The hub member also has a first formed conical portion 40 and a second formed conical portion 42 positioned radially outwardly from the central opening 36 and central portion 34. A generally axial extending flange member 44 is positioned radially outwardly of formed portion 42. A rim member 46 is positioned adjacent the outer periphery 32 of the hub member. The flared outer rim member 46 increases the stiffness and strength of the hub member during rotation, and prevents localized high stresses.

A first series of holes or openings 50 is positioned in an annular ring on the second formed portion 42. The openings 50 are circular in shape in the drawings, but they can be any shape, such as oval, square, triangular, etc. In the example shown, these openings are arranged in groups of four openings. The number of groups preferably corresponds to the number of blade members 30 provided on the fan member 10.

A second series of holes or openings 60 is positioned in an annular ring on the outer flange member 44. Again, although the openings 60 are shown as being oval shaped in the drawings, the openings 60 can have any shape. The openings 60 are also arranged in groups of four openings. Again, the number of groups preferably corresponds to the number of blade members 30 on the fan 10.

The openings 50 and 60 extend through the hub member (as shown in the drawings). This allows the plastic polymer material to flow through them when the blade members are formed, as described in more detail below.

The number of openings 50 and 60 in each grouping is not critical. The purpose of the openings is to securely affix and attach the blade members onto the hub member. Even a single hole or opening could be provided if it was of sufficient size to fixedly secure the blade members to the hub member. A larger number of openings could also be provided, although they should be of sufficient size to form a strong attachment of the plastic polymer material to the hub member. There also cannot be too many openings in each grouping which might cause the hub member to be weakened.

Thus, the strength of the hub member is dependent on many factors, such as the type of material utilized, the thickness of the material, the amount of forming performed on the hub member, and the number of openings provided in it. In this regard, the holes or openings 50 and 60 can be formed in any way in the hub member (shaping, stamping, drilling, cutting, etc.) and at any time in the forming process utilized.

The blade members 30 each have a base portion 70 and an outwardly extending blade portion 72. The blade members are overmolded onto the hub member. The plastic polymer material is provided in a molten form and each blade member is molded onto the edge of the hub member to form the complete fan 10 as shown. Preferably, the blade members are molded individually onto the hub member. This can be accomplished in many ways known in the art, such as by use of a rotary or rotational molding system in which the hub member is mounted on a fixture and rotated in an indexed manner through a blade forming mold in order to allow each blade member to be separately formed on the hub member. Such a process also allows the size and shape of the blade member to be customized depending on its design, purpose, and air flow requirements of the cooling fan.

As shown particularly in FIG. 5, the plastic polymer forming each blade member flows through (or passes through) each of the openings 50 and 60 forming a tight and secure attachment when the plastic polymer cools and solidifies. In this regard, as noted above, each of the base portions of each of the blade members flows through all of the openings in one of the groups of openings 50, 60. This provides a stronger and more secure attachment of the blade members to the hub member.

The openings 50 and 60 are preferably formed in aligned pairs of groupings such that a load path 80 exists through the base portion of each blade member and up through the blade portion. Such a centripetally-induced load path 80 is shown in FIG. 5. This assists in overcoming loads due to centripetal forces.

Although the hub member as described herein has two series or rings of openings, it is also possible to provide only one ring of openings in the hub member—or even more than two rings of openings. The openings in each ring of openings also do not have to be arranged in groupings as discussed. Instead, a ring of equally spaced openings could be provided in the hub member for attachment of the blade members, and all of the openings would not necessarily have to be utilized for attaching the blade members. Some of the openings could be left exposed.

It is also conceivable in another embodiment to provide holes or openings for the blade members which do not extend entirely through the hub member. Such "blind holes" would not secure the blade members to the hub member as securely or as tightly as through-holes, however.

A series of reinforcing ribs 90 can be positioned on the back side of the base portions of the blade members. These are shown in FIG. 3. Preferably, the ribs 90 are aligned with pairs of aligned openings in the hub members. This assists in carrying the loads experienced by the fan members when they are rotated in use.

Embodiments of the invention can have a wide variety of dimensions and specifications. For example, the hub member if made of a metal material can be formed by a deep-drawing process. The angle of the flared outer rim 46 can be from 70°-90°. The number of holes 50 and 60 can be from 2-6 holes per group. As indicated above, the holes can be any shape, such as circular, elliptical, oval, etc., and can be formed as blind-holes or through-holes by a stamping process. The outer substantially cylindrical drawn conical annular ring 44 can have a half-angle of from 0-20°.

The conical formed annular surface 42 which connects the outer drawn ring 44 to the inner raised surface 34 can have a half-angle of 60-80°. The depth of the draw is 50-100% of the depth of the outer drawn ring 44.

The inner raised surface (form) 34 can have a depth of draw of about 25-100% of the depth of the draw of the outer drawn ring 44. The radial clearance between the circle of bolts (fastener) holes 50 and the raised form 34 is about 6-50 mm.

While the invention described in connection with various embodiments, it will be understood that the invention is not limited to those embodiments. On the contrary, the invention covers all alternatives, modifications, and equivalents as may be included within the spirit and scope of the appended claims.

What is claimed is:

1. A cooling fan comprising:
   a hub that is rotatable about a rotational axis, the hub being formed with a first hub portion, a second hub portion, a third hub portion, a fourth hub portion and a fifth hub portion, the first hub portion having a flat annular shape with first and second axial end surfaces that are disposed opposite one another, the second hub portion being coupled to a radially outer end of the first hub portion and flaring outwardly from the first hub portion in a first direction along the rotational axis, the third hub portion being coupled to a radially outer end of the second hub portion and flaring outwardly from the second hub portion in a second direction along the rotational axis that is opposite the first direction, the fourth hub portion being coupled to a radially outer end of the third hub portion and flaring outwardly from the third portion in the first direction along the rotational axis, the fifth hub portion being coupled to a radially outer end of the fourth hub portion and extending radially outward therefrom, wherein a plurality of first hole sets are formed through the third hub portion and a plurality of second hole sets are formed through the fourth hub portion, each of the first hole sets comprising a plurality of first holes, each of the second hole sets comprising a plurality of second holes, wherein the second and third hub portions intersect on a first axial side of the first hub portion such that the first axial end surface of the first hub portion is disposed along the rotational axis between the second axial end surface and the intersection between the second and third hub portions, wherein the third and fourth hub portions intersect on a second axial side of the hub portion such that the second axial end surface of the first hub portion is disposed along the rotational axis between the first axial end surface and the intersection between the third and fourth hub portions and wherein the fourth and fifth hub portions intersect on the first axial side of the first hub portion; and
   a plurality of fan blades, each of the fan blades having a blade portion and a base portion that is coupled to the blade portion, the base portion being overmolded onto the third, fourth and fifth hub portions such that:
      portions of the fourth and fifth hub portions over which the base portion extends are encapsulated in a plastic polymer material from which the base portion is formed,
      the base portion extends through the plurality of first holes in one of the first hole sets and through the plurality of second holes in one of the second hole sets,
      the base portion is received into an annular, generally V-shaped channel defined by the fourth hub portion and a portion of the third hub portion, wherein at least portions of the base portion in the generally V-shaped channel span completely between sides of the V-shaped channel, and
      the base portion is disposed over a portion of the third hub portion on a side that is opposite the annular, generally V-shaped channel.

2. The cooling fan of claim 1, wherein the plastic polymer material comprises polyamide.

3. The cooling fan of claim 2, wherein the plastic polymer material is polycaprolactam.

4. The cooling fan of claim 1, wherein the plastic polymer material comprises a filler.

5. The cooling fan of claim 4, wherein the filler comprises glass.

6. The cooling fan of claim 1, wherein the fifth hub portion flares outwardly from the fourth hub portion in the first direction along the rotational axis, wherein the fourth and fifth hub portions diverge away from the rotational axis at different angles.

7. The cooling fan of claim 1, wherein each of the first and second holes has a center point and wherein each of the first holes is paired with a corresponding one of the second holes such a line extending radially from the rotational axis intersects the center points of the paired first and second holes.

8. The cooling fan of claim 1, wherein a plane extending through first hub portion that is oriented perpendicular to the rotational axis extends through the first and second holes.

9. The cooling fan of claim 1, wherein the fan blades are discrete structures that are spaced circumferentially around the hub apart from one another.

10. The cooling fan of claim 1, wherein the fan blades are connected to one another only through the hub.

11. The cooling fan of claim 1, wherein the hub is formed of metal.

12. The cooling fan of claim 11, wherein the metal is steel.

13. A method for forming a cooling fan, the method comprising:
   providing a fan hub, the hub being formed with a first hub portion, a second hub portion, a third hub portion, a fourth hub portion and a fifth hub portion, the first hub portion having a flat annular shape with first and second axial end surfaces that are disposed opposite one another, the second hub portion being coupled to a radially outer end of the first hub portion and flaring outwardly from the first hub portion in a first direction along the rotational axis, the third hub portion being coupled to a radially outer end of the second hub portion and flaring outwardly from the second hub portion in a second direction along the rotational axis that is opposite the first direction, the fourth hub portion being coupled to a radially outer end of the third hub portion and flaring outwardly from the third portion in the first direction along the rotational axis, the fifth hub portion being coupled to a radially outer end of the fourth hub portion and extending radially outward therefrom, wherein a plurality of first hole sets are formed through the third hub portion and a plurality of second hole sets are formed through the fourth hub portion, each of the first hole sets comprising a plurality of first holes, each of the second hole sets comprising a plurality of second holes, wherein the second and third hub portions intersect on a first axial side of the first hub portion such that the first axial end surface of the first hub portion is disposed along the rotational axis between the second axial end surface and the intersection between the second and third hub portions, wherein the third and fourth hub portions intersect on a second axial side of the hub portion side such that the second axial end surface of the first hub portion is disposed along the rotational axis between the first axial end surface and the intersection between the third and fourth hub portions and wherein the fourth and fifth hub portions intersect on the first axial side of the first hub portion;

molding a plurality of fan blades onto the fan hub, wherein each of the fan blades has a blade portion and a base portion that is coupled to the blade portion, the base portions being molded directly onto the third, fourth and fifth hub portions such that:
  portions of the fourth and fifth hub portions over which the base portion extends are encapsulated in a plastic polymer material from which the base portion is formed,
  the base portion extends through the plurality of first holes in one of the first hole sets and through the plurality of second holes in one of the second hole sets,
  the base portion is received into an annular, generally V-shaped channel defined by the fourth hub portion and a portion of the third hub portion, wherein at least portions of the base portion in the generally V-shaped channel span completely between sides of the V-shaped channel, and
  the base portion is disposed over a portion of the third hub portion on a side that is opposite the annular, generally V-shaped channel.

\* \* \* \* \*

UNITED STATES PATENT AND TRADEMARK OFFICE
CERTIFICATE OF CORRECTION

PATENT NO. : 9,523,372 B2  
APPLICATION NO. : 13/696672  
DATED : December 20, 2016  
INVENTOR(S) : Jonathan B. Stagg It is certified that error appears in the above-identified patent and that said Letters Patent is hereby corrected as shown below:

In the Claims

In Line 33 of Claim 13, after "portion" delete "side" therefor.

Signed and Sealed this
Twenty-eighth Day of March, 2017

Michelle K. Lee
*Director of the United States Patent and Trademark Office*